Figure 1:
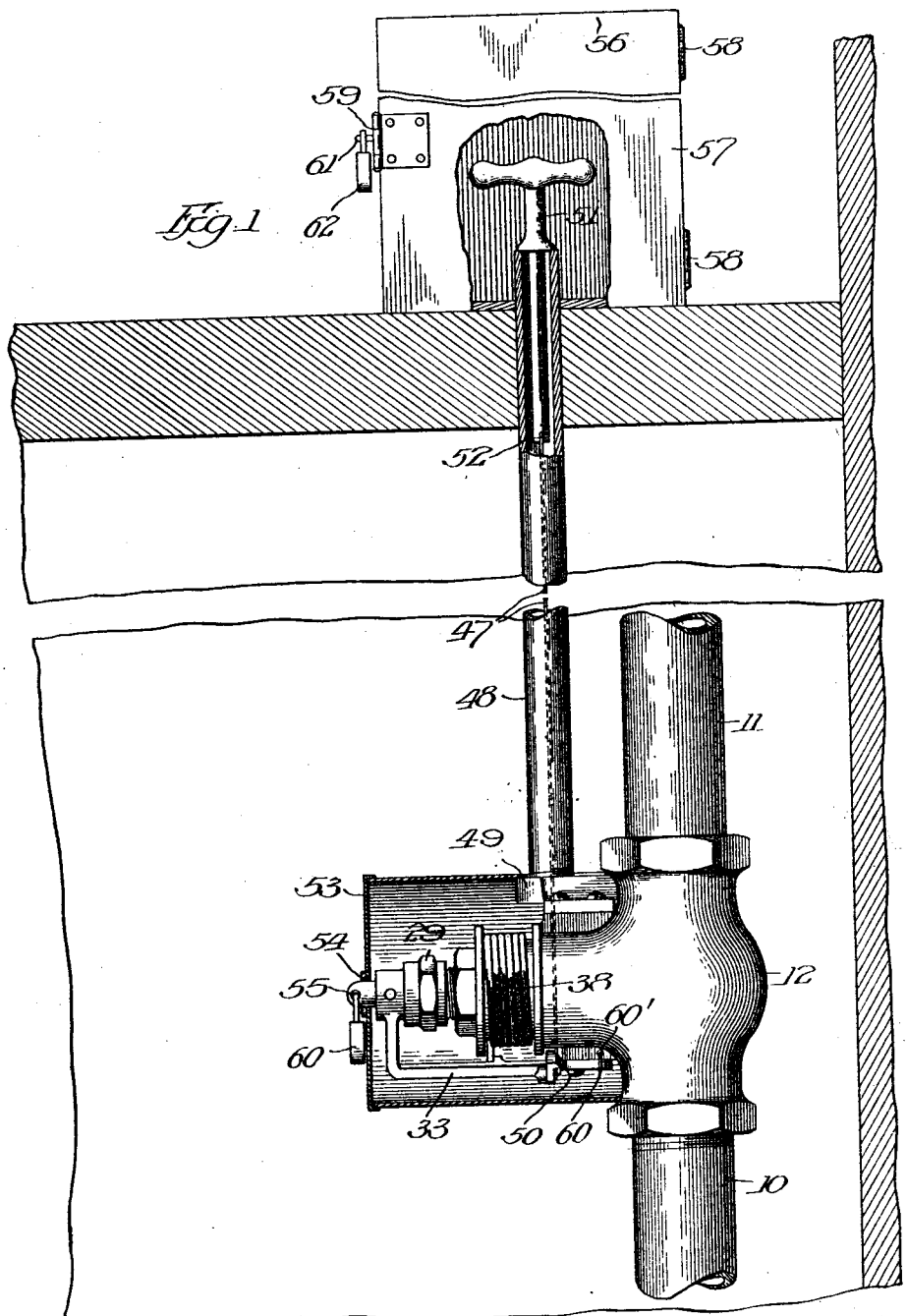

C. L. BASTIAN.
FLUID CUT-OFF.
APPLICATION FILED JUNE 28, 1912.

1,186,733.

Patented June 13, 1916.
2 SHEETS—SHEET 1.

Witnesses:

Inventor
Charles L. Bastian

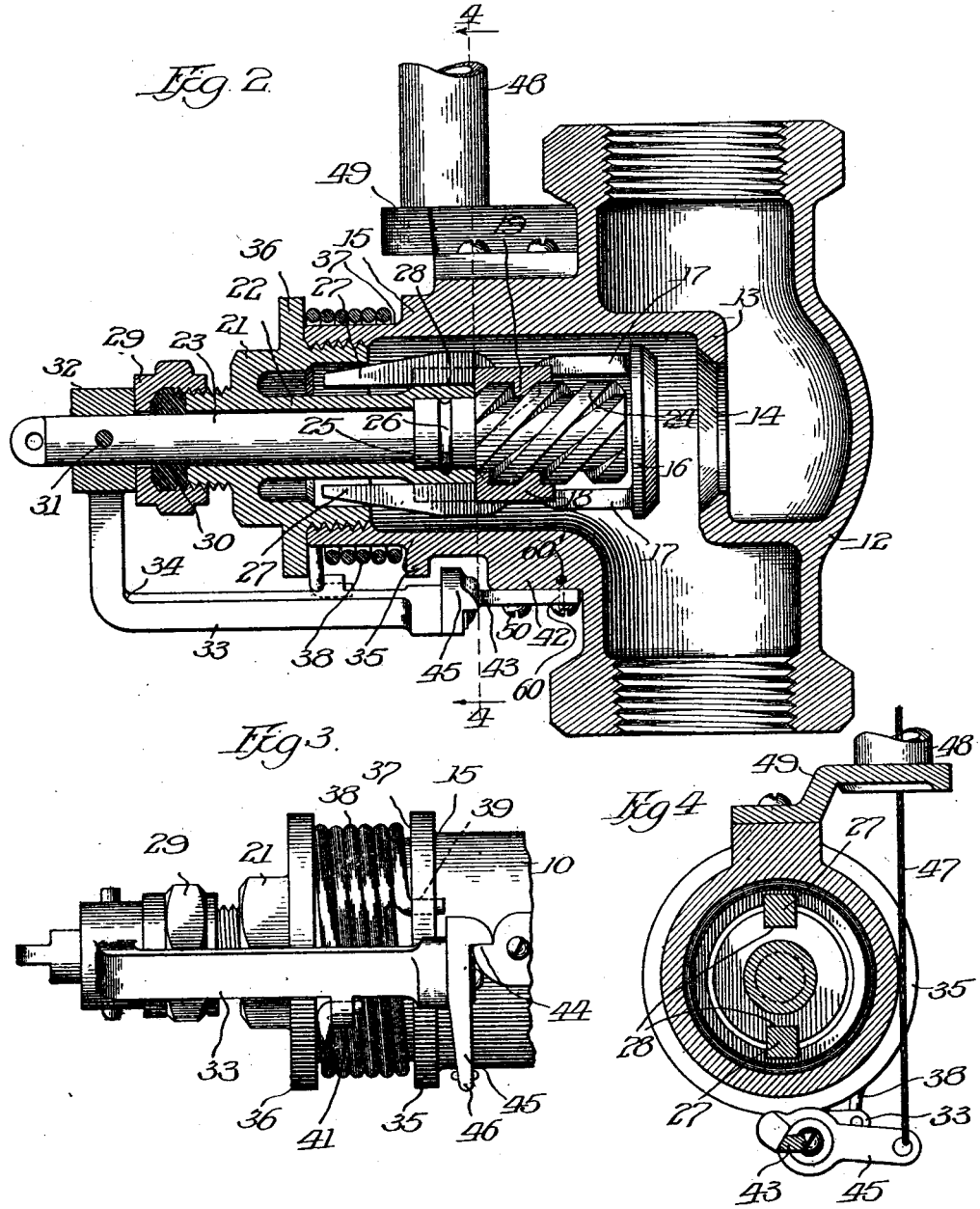

UNITED STATES PATENT OFFICE.

CHARLES L. BASTIAN, OF CHICAGO, ILLINOIS.

FLUID CUT-OFF.

1,186,733.　　　　　Specification of Letters Patent.　　Patented June 13, 1916.

Application filed June 28, 1912. Serial No. 706,327.

*To all whom it may concern:*

Be it known that I, CHARLES L. BASTIAN, a citizen of the United States, residing at Chicago, in the county of Cook and State of Illinois, have invented certain new and useful Improvements in Fluid Cut-Offs, of which the following is a specification.

My invention relates in general to fluid cut-offs, and more particularly to cut-offs or valves adapted to be positioned in the main supplying gas or other fluid to a building, and which while normally locked in open position may be closed by an operating handle situated without the building or in some easily accessible location within the building, to cut off the supply of fluid in time of fire or other emergency.

While it is true that fluid cut-offs constructed to accomplish this purpose have been tested and employed to a limited extent prior to my invention, they have all, so far as I am aware, been subject to much inconvenience and uncertainty of operation. The cause of this has chiefly been that the valve itself has been lifted vertically from its seat against the action of a spring by pressure applied to the valve stem, the release of the pressure permitting the spring to close the valve. As fluid cut-offs used for the purpose indicated are, in the greater number of instances, maintained in open position for long periods of time, the spring pressing the valve upon its seat has been found frequently to have rusted and to have lost its resiliency, making the operation of the valve depend solely upon its weight for an actuating force, and, where the valve is positioned in other than a horizontal plane, rendering the valve inoperative.

One of the principal objects of the invention is to provide a valve of the character described which will be immediately closed when the controlling handle is operated, and which will operate with assured efficiency whether positioned vertically, horizontally or at an intermediate inclination.

Another object of my invention is to provide a fluid cut-off wherein the valve will be yieldingly urged into closed position when the controlling handle is operated, so constructing and arranging the parts that should the yielding means fail to operate the valve will be positively moved to closed position, thus insuring the proper closing of the valve regardless of the usual deterioration of the parts.

A further object of my invention is to provide a fluid cut-off wherein the valve itself will be positively held upon its seat when the valve is closed so that no shock or jarring of the parts will serve to open the valve.

Further objects and advantages of my invention will be apparent as it is better understood from the following description which, taken in connection with the accompanying drawings, illustrates one preferred embodiment thereof.

On the drawings:—Figure 1 is a partial side elevation, with the cover shown in section, of the cut-off and its operating handle when the valve is in open position; Fig. 2 is an enlarged vertical sectional view of the cut-off shown in Fig. 1; Fig. 3 is an enlarged detail view of the portion of the valve-operating mechanism located outside the casing, and Fig. 4 is a horizontal sectional view on the line 4—4 of Fig. 2.

On the drawings 10 designates a pipe for supplying gas or other fluid to the building, and 11 a pipe for distributing such fluid to the illuminating and heating appliances, or both, in such building. The pipes 10 and 11 are connected by means of a valve casing 12 in which is provided a diaphragm or partition 13 having a tapering valve-seat 14. Upon the side of the casing and communicating with its interior is a hollow circular housing 15 in which the valve 16 is mounted to move longitudinally.

Extending outwardly from the rear of the valve 16 is a pair of arms 17, the outer ends of which are connected to and preferably made integral with a collar 18. The interior of this collar is provided with a plurality of threads 19 of high pitch, whose use will be hereinafter described. In the end of the housing 15 is secured a closure 21 having an inwardly extending centrally disposed circular hollow boss 22, in which a rotatable shaft 23 terminating at its bottom in an enlarged screw 24 is mounted. The threads upon the screw 24 are adapted to coöperate with the threads 19 within the collar 18 to open and close the valve 16 by moving it longitudinally away from and toward its seat, the pitch of these threads being sufficiently high to permit the opening and closing of the valve in less than one-half revolution of the shaft 23. The shaft 23 is held against longitudinal movement by a pin 25 positioned in the depending hollow boss 22 and engaging a circumferential groove 26 provided upon the shaft 23 for this purpose. Above the collar 18 and preferably integral therewith is provided a pair of upwardly extending lugs 27 and in the end of the boss is formed a pair of slots 28 in which the lugs 27 are adapted to slide longitudinally to prevent the rotation of the valve 16 when the shaft 23 is turned to lift or lower the valve. Above and in threaded engagement with the closure 21 is provided a gland 29 containing suitable packing 30 to prevent the fluid from escaping around the shaft 23 which extends through and above this gland.

To rotate the shaft 23 I provide an arm 33 which is bent substantially at right angles as at 34, one end of the arm being provided with a collar 32 in which an end of the shaft 23 is secured by means of a pin 31, the other end of the arm 33 being disposed substantially parallel to the shaft 23 outside and extending a substantial distance beneath the top of the housing. Located upon the housing and at a substantial distance beneath its top is an encircling rib 35, and upon the closure 21 is provided a similar rib 36 which, when the closure is in position, is adapted to form with the rib 35 an encircling channel 37 about the housing. In this channel is mounted a coiled spring 38 constituting a motor for closing the valve, one end of which is secured in an aperture 39 in the rib 35 and the other end of which is similarly secured in a lug 41 suitably positioned upon the arm 33. Upon the casing at the base of the housing and preferably beneath the end of the arm 33 upon an outwardly disposed shoulder 42 formed on the casing is secured a member 43 having a beveled face 44 adapted to engage a trigger 45 which is rotatably mounted at its center upon an end of the arm 33. To the end 46 of the trigger in a suitable aperture is fastened a flexible connection 47 which is adapted to rotate the trigger about its pivotal connection with the arm 33 when it is desired to release the spring 38 to cause the closing of the valve. Upon the opposite end of the casing and spaced outwardly therefrom is preferably secured an end of the pipe 48 as shown at 49. The flexible connection 47 is disposed within the pipe 48, and is connected to the end of an operating handle 51 as at 52.

When the cut-off is to be used it is positioned in the gas-main as shown in Fig. 1, and is preferably located beneath the sidewalk. In this figure the valve is shown as disposed in a vertical plane, and a single pipe 48 is employed extending from the cut-off to just above the surface of the pavement, although it is understood that the cut-off may be positioned in other locations, and proper connection made between the handle 51 and the trigger 45 by providing means for permitting a pull upon the handle to rotate the trigger 45 out of engagement with the member 43 through the flexible connection 47.

When in use the valve is normally in open position as is shown in Fig. 3, the opening of the valve being obtained by moving the arm 33 about the central axis of the shaft 31 against the force of the spring 38 until the trigger 45 engages with the beveled face 44 of the member 33. This movement of the arm 33 causes the shaft 31 to revolve, lifting the valve from its seat by the coaction between the threads 24 of the shaft and the threads 19 of the collar carried by the valve, the lugs 27 sliding within the slots 28 of the depending hollow circular boss 22. Thus it is apparent that when the valve is in open position and the parts arranged as hereinbefore described the spring 38 is under tension, and the movement of the trigger 45 out of engagement with the member 43 will immediately cause the arm 33 to move back around the axis of the shaft 31, closing the valve by the turning of this shaft.

The cut-off may be rendered self-acting by constructing the fastenings of the member 43 so that excessive heat within the building will cause the release of the trigger 45. This may be accomplished by pivotally securing the member 43 to the shoulder 42 by means of a screw 50, or its equivalent, and fastening the member 43 against rotation by means of the fusible link 60 embracing the member and positioned through an aperture 60', such an arrangement obviously not interfering with the manual control hereinbefore described.

It will also be apparent that a valve made in pursuance of my invention may be positioned in the gas-main in any location, and that it will operate with equal efficiency when disposed vertically, horizontally or inclined at any desired angle, it only being necessary that the connection 47 be properly located and capable of releasing the trigger 45.

It will be readily understood also that the connection 47 is adapted to not only release the trigger 45 and permit the spring to close the valve but is capable of itself, should the spring fail to work, of closing the valve by exerting a pull upon the arm 33 to positively move the arm in an arc, thereby rotating the shaft.

It will be manifest also that when a valve made in pursuance of my invention has been positioned upon its seat no jarring of the parts from explosion within the building or from the falling of heavy articles or other causes normally tending to shake the building in time of fire will be capable of unseating the valve and permitting the escape of as into the burning building, as the threaded connection between the collar 18 and the shaft 23 will positively hold the valve in position.

In order to prevent the cut-off from being tampered with and to protect the same against injury from numerous sources I employ the cover 53 adapted to inclose the housing and working parts and to fit snugly upon the casing 12. In this cover is provided an aperture 54 through which the top of the shaft 23 is adapted to extend, and in the top of this shaft I provide an aperture 55 adapted to receive a lock 60 to prevent the cover from being removed. In order that the gas may not be inadvertently turned off from the building I protect the operating handle 51 by means of a box 56 disposed above the sidewalk. This box has a side 57 preferably hinged as at 58, and adapted to be secured in closed position by a hasp 59, a staple 61 and a suitable lock 62.

It is obvious that various changes may be made in the form, construction and arrangement of the parts of my invention without departing from the spirit or scope thereof, or sacrificing any of its advantages, the form hereinbefore disclosed being merely one preferred embodiment thereof.

I claim:—

1. A fluid cut-off comprising a valve casing, a valve disposed therein, a mechanism for positively actuating said valve, a spring coiled about said casing and secured at one end thereto and at the other to said mechanism to actuate the latter, means for normally retaining said valve in open position against the action of said spring, and manually operable means for releasing said retaining means and permitting said spring to cause said mechanism to close the valve.

2. A fluid cut-off comprising a valve casing, a valve having a hollow stem positioned in said casing, a revoluble member mounted in engagement with the bore of said stem and adapted to open and close the valve, a motor disposed without said casing and connected to said member, whereby the latter is actuated, means for restraining said motor with the valve in open position, and manually operable means for releasing said restraining means.

3. A fluid cut-off comprising a valve casing, a valve positioned within said casing, a member in threaded engagement with the stem of the valve for opening and closing said valve, a motor for operating said member disposed without said casing, means for retaining said motor inoperative and the valve in open position, and manually operable means for releasing said retaining means.

4. A fluid cut-off comprising a valve casing, a valve member mounted in said casing, a valve-actuating member engaging the stem of said valve member, one of said members being rotatable and the other held against rotation, a motor for operating said valve-actuating member disposed without said casing, means for retaining said motor inoperative and the valve in open position, and manually operable means for releasing said retaining means.

5. A fluid cut-off comprising a valve casing, a valve member mounted in said casing, a valve-actuating member engaging the stem of said valve member, said members being in threaded connection with each other and one of said members being rotatable and the other held against rotation, a motor for operating said valve-actuating member disposed without said casing, means for retaining said motor inoperative and the valve in open position, and manually operable means for releasing said retaining means.

6. A fluid cut-off comprising a valve casing, a longitudinally movable valve, a revolving member in threaded engagement with the stem of the valve, yielding means connected with said member tending to rotate the same and urge the said member to close the valve, means for retaining the yielding means in inoperative position, and means for releasing the said yielding means from the retaining means to permit the closing of the valve.

7. A fluid cut-off comprising a valve casing, normally open, a longitudinally movable valve, a revolving member held against longitudinal movement and adapted to open and close the valve, yielding means connected with said member tending to rotate the same and urge the said member to close the valve, means for retaining the yielding means in inoperative position, and means for releasing the said yielding means from the retaining means to permit the closing of the valve.

8. A fluid cut-off comprising a valve casing, a longitudinally movable valve positioned in the said casing, a rotary member fixed against longitudinal movement and in threaded engagement with the stem of the said valve, a spring coiled about the said casing having one end connected thereto, a connection between the said member and spring, said spring being normally under tension whereby the spring normally urges the said member to close the said valve, means for retaining the spring in inoperative position to maintain the valve in open position, and means for releasing the spring from the said retaining means.

9. A fluid cut-off comprising a valve casing, a longitudinally movable valve positioned in the said casing, a rotary member mounted in said casing adapted to open and close the valve, an element disposed without the casing and connected to the said member and rotatable therewith, yielding means disposed about the casing and connected to said element and normally positioned so as to urge the said member to close the valve, means for retaining the said yielding means in inoperative position to maintain the valve in open position, and means for releasing said yielding means from the retaining means to permit the closing of the valve.

10. A fluid cut-off comprising a valve casing, a valve positioned in the said casing, a mechanism for opening and closing said valve, a spring coiled about the said casing and secured at one end thereto and at the other to the said mechanism and adapted to normally urge the said mechanism to close the valve, means for retaining the said spring in inoperative position to maintain the valve in open position, and means for releasing the said spring from the retaining means to permit closing of the valve.

11. A fluid cut-off comprising a valve casing, a valve disposed in said casing, a mechanism for opening and closing said valve, a spring coiled about said casing and secured at one end thereto and at the other to said mechanism to actuate the latter, a member mounted upon said casing, a trigger secured to said mechanism and adapted to engage said member to maintain the spring in inoperative position and to maintain the valve in open position, and means for releasing said trigger.

12. A fluid cut-off comprising a valve casing, a valve disposed in said casing, mechanism for opening and closing said valve, a spring coiled about said casing and secured at one end thereto and at the other to said mechanism to actuate the latter, a member mounted upon said casing, a trigger secured to said mechanism and adapted to engage said member to maintain said spring in inoperative position and to maintain the valve in open position, and means for releasing said trigger to permit the closing of the valve, said means comprising an operating handle and a flexible connection between said handle and trigger.

13. A fluid cut-off comprising a casing having a housing open at both ends formed upon its side communicating with the interior of the casing, a closure for the outer end of the said housing having a hollow cylindrical member extending within the casing, a slotted collar formed on the end of the said hollow member, a rotatable element threaded at its inner end disposed within the said hollow member and fixed against longitudinal movement relative thereto, a valve having a hollow internally threaded stem adapted to receive an end of the said rotatable element and provided with a plurality of outwardly extending lugs adapted to move longitudinally in the slots of the said collar, and means for rotating the said element to open and close the valve.

14. A fluid cut-off comprising a valve casing, a valve positioned in said casing, means for setting the valve in open position, a bodily removable cover for said means adapted to be locked in place, and an operating handle disposed without the said cover adapted to release said means to permit the valve to close.

15. A fluid cut-off comprising a valve casing, a valve positioned in said casing, means for setting the valve in open position, a bodily removable cover for said means carried by said casing and adapted to be locked in place, and an operating handle disposed without said cover and adapted to release said means to permit the valve to close.

16. A fluid cut-off comprising a valve casing, a valve disposed in the said casing, a mechanism for opening and closing the said valve, yielding means for operating the said mechanism normally held inoperative, a member pivotally mounted upon the said casing, fusible means holding the said member against rotation, a trigger secured on the said mechanism and adapted to engage the said member to maintain the yielding means in inoperative position and to maintain the valve in open position, and means for releasing the said trigger to permit the closing of the valve.

CHARLES L. BASTIAN.

Witnesses:
J. C. CARPENTER,
M. A. KIDDIE.